Patented Mar. 20, 1951

2,545,876

UNITED STATES PATENT OFFICE 2,545,876

ALKENYLENE BISISOTHIOURONIUM COMPOUNDS

Le Roy W. Clemence, Highland Park, and Marlin T. Leffler, Lake Bluff, Ill., assignors to Abbott Laboratories, North Chicago, Ill., a corporation of Illinois No Drawing. Application September 17, 1948, Serial No. 49,854

10 Claims. (Cl. 260—564)

The present invention relates to substituted bis-isothiouronium compounds which are active against certain parasitic and bacterial diseases. More specifically our invention relates to the bis-isothiouronium compounds that are substituted with an unsaturated group.

The compounds of our invention may be illustrated by the following formula:

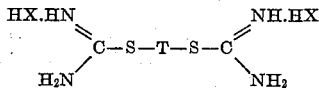

wherein X is a halogen atom such as chlorine and bromine, and T is an unsaturated hydrocarbon such as unsaturated straight and branched aliphatic chains including substituted unsaturated chains. Examples of substituents are halogen, alkyl and alkoxy groups. The unsaturated aliphatic chains preferably contain 4 to 6 carbon atoms inclusive.

Generally, the compounds of our invention may be prepared by the reaction of 2 moles of thiourea with 1 mole of the dihalide of the desired unsaturated substituting group. In our invention we prefer to use the dibromide or the dichloride substituting unsaturated hydrocarbon groups. The dihalide intermediate is generally obtained from the unsaturated diol.

In more specific detail the following examples illustrate our invention:

Example I

About 1 mole of 1,4-dichloro-2-butene is dissolved in about 14 moles of absolute ethanol and filtered. About 2 moles of thiourea are dissolved in about 24 moles of absolute ethanol, filtered and added to the 1,4-dichloro-2-butene ethanol solution and refluxed for about 2 hours. The reaction mixture is cooled and the crystals which have formed are filtered, washed with cold ethanol and dried. The 2-butene-1,4-bis-isothiouronium chloride that is formed has a melting point of 216–217° C. with decomposition.

Example II

About 0.2 mole of 1,4-dibromo-3-methyl-2-butene (obtained by brominating isoprene) and 0.4 mole of thiourea are reacted according to the procedure of Example I to yield 3-methyl-2-butene-1,4-bis-isothiouronium bromide which has a melting point of 198–199° C. with decomposition.

Following the procedure of Example I, using the dibromide or dichloride unsaturated T intermediate, the dihalide salt is as follows:

| | T | M. P. |
|---|---|---|
| 1. | —CH₂—C≡C—CH₂—<br><br>2-butyne-1,4-bis-isothiouronium dihydrochloride | 182–183° C. with decomposition. |
| 2. | —CH₂—C—CH₂—<br>‖<br>CH₂<br><br>3-isothioureido-2-isothioureidomethyl-1-propene-dihydrochloride | 137–140° C. with decomposition. |
| 3. | —CH₂—CH—<br>       CH<br>       ‖<br>       CH₂<br><br>3,4 bis-isothioureido-1-butene-dihydrochloride | 202–204° C. with decomposition. |
| 4. | —CH₂—CH=C—CH₂—<br>            Cl<br><br>1,4-bis-isothioureido-3-chloro-2-butene dihydrobromide | 204–205° C. with decomposition. |
| 5. | —CH₂—CH=CH—CH—<br>                CH₃<br><br>1,4-bis-isothioureido-4-methyl-2-butene dihydrobromide | 210–211° C. with decomposition. |

| | T | M. P. |
|---|---|---|
| 6. | $-CH_2-CH_2-CH=CH-CH_2-CH_2-$<br>3-hexene-1,6-bis-isothiouronium dihydrobromide<br>(The intermediate is formed by reducing β-hydromuconic acid to form 3-hexene-1,6-diol which is brominated to form the dibromo intermediate.) | 173–174° C. with decomposition. |
| 7. | $-CH_2-C\equiv C-C\equiv C-CH_2-$<br>2,4-hexadiyne-1,6-bis-isothiouronium dihydrobromide | 65–67° C. with decomposition. |
| 8. | $-CH_2-CH=CH-CH=CH-CH_2-$<br>2,4-hexadiene-1,6-bis-isothiouronium dihydrobromide | 199–200° C. with decomposition. |
| 9. | $-CH_2-CH_2-C\equiv CH_2-CH_2-$<br>3-hexyne-1,6 bis-isothiouronium dihydrobromide | 145–148° C. with decomposition. |

The above compounds as stated above are prepared by following the procedure of Example I. The products 1,4-bis-isothioureido-4-methyl-2-butene dihydrobromide and 3-hexene-1,6-bis-isothiouronium dihydrobromide, for example, are prepared by refluxing one mole of 4-methyl-2-butene-1,4-dibromide and one mole of 3-hexene-1,6-dibromide, respectively, with two moles of thiourea in absolute ethanol in accordance with the procedure of Example I.

As at present advised with respect to the apparent scope of our invention, we desire to claim the following subject matter.

We claim:

1. Compound of the formula:

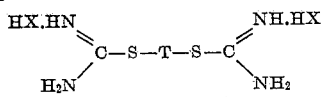

wherein X is a halogen atom and T is an unsaturated aliphatic hydrocarbon group containing 4–6 carbon atoms.

2. 1,4 - bis - isothioureido - 2 - butene - dihydrochloride.

3. 3 - isothioureido - 2 - isothioureidomethyl-1-propenedihydrobromide.

4. 1,4 - bis - isothioureido - 4 - methyl - 2 - butene dihydrobromide.

5. 3 - hexene - 1,6 - bis - isothiouronium dihydrobromide.

6. 2,4 - hexadiene - 1,6 - bis - isothiouronium dihydrobromide.

7. A process for producing the compounds of claim 1 consisting of refluxing 1 mole of the dihalide of T with 2 moles of thiourea in an anhydrous organic solvent.

8. A process of producing the compounds of claim 2 consisting of refluxing 1 mole of 2-butene-1,4-dichloride with 2 moles of thiourea in absolute ethanol.

9. A process of producing the compounds of claim 4 consisting of refluxing 1 mole with 4-methyl-2-butene-1,4 dibromide with 2 moles of thiourea in absolute ethanol.

10. A process of producing a compound of claim 5 consisting of refluxing 1 mole of 3-hexene-1,6-dibromide with 2 moles of thiourea in absolute ethanol.

LE ROY W. CLEMENCE.
MARLIN T. LEFFLER.

REFERENCES CITED

The following references are of record in the file of this patent:

UNITED STATES PATENTS

| Number | Name | Date |
|---|---|---|
| 2,063,461 | Puetzer | Dec. 8, 1936 |
| 2,302,885 | Orthner et al. | Nov. 24, 1942 |
| 2,347,827 | Hunt | May 2, 1944 |
| 2,390,046 | Albrecht | Dec. 4, 1945 |
| 2,405,806 | Albrecht | Aug. 13, 1946 |
| 2,459,440 | Lieber | Jan. 18, 1949 |
| 2,463,998 | Rohrmann | Mar. 8, 1949 |

OTHER REFERENCES

"Chemical Abstracts," vol. 25 (1931) p. 5665.
Levy et al., "J. Chem. Soc." (London) 1939, pp. 1442–1446.
Ruggli et al., "Helv. Chim. Acta," vol. 28 (1945), pp. 674 to 690.